United States Patent
Li et al.

(10) Patent No.: US 7,773,086 B2
(45) Date of Patent: Aug. 10, 2010

(54) RANGE-PEELING FOR PUNCHING MASKS IN VOLUME RENDERING

(75) Inventors: Wei Li, Princeton, NJ (US); Daphne Yu, Yardley, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 756 days.

(21) Appl. No.: 11/687,728

(22) Filed: Mar. 19, 2007

(65) Prior Publication Data

US 2007/0237038 A1  Oct. 11, 2007

Related U.S. Application Data

(60) Provisional application No. 60/790,447, filed on Apr. 7, 2006.

(51) Int. Cl.
*G06T 17/00* (2006.01)
(52) U.S. Cl. .................. 345/420; 345/419; 345/421; 345/423; 345/424; 345/426; 345/427; 382/241; 369/13.35
(58) Field of Classification Search ........... 345/419, 345/420, 423, 424, 426, 427; 382/241; 369/13.35
See application file for complete search history.

(56) References Cited

U.S. PATENT DOCUMENTS

| 5,645,673 | A  | * | 7/1997  | Fasano et al. | ............ 156/89.16 |
| 7,139,003 | B1 | * | 11/2006 | Kirk et al.   | ............ 345/531 |
| 7,450,123 | B1 | * | 11/2008 | Kilgard       | ............ 345/426 |
| 7,460,119 | B2 | * | 12/2008 | Li            | ............ 345/421 |
| 2006/0164410 | A1 |   | 7/2006 | Li |  |

OTHER PUBLICATIONS

Borland "Volumetric depth peeling for the medical image display", Published Jan. 16, 2006.*
Nagy et al. "Depth-Peeling for Texture-Based Volumetric Rendering", Published 2003.*
Bernadon et al. GPU-based tiled Ray Casting using depth peeling:, Published Jul. 26, 2004.*

* cited by examiner

*Primary Examiner*—Kimbinh T Nguyen
(74) *Attorney, Agent, or Firm*—Donald B. Paschburg (57) ABSTRACT

Rendering with a punching mask is performed without voxelization. A plurality of sub-volumes are identified as a function of the punching mask. The sub-volumes are generally layered in range. Each sub-volume is rendered separately or independently. The renderings from multiple passes or sub-volumes are composited together.

20 Claims, 4 Drawing Sheets

RANGE-PEELING FOR PUNCHING MASKS IN VOLUME RENDERING

RELATED APPLICATIONS

The present patent document claims the benefit of the filing date under 35 U.S.C. §119(e) of Provisional U.S. Patent Application Ser. No. 60/790,447, filed Apr. 7, 2006, which is hereby incorporated by reference.

BACKGROUND

The present embodiments relate to volume rendering with masks. In particular, a dataset representing a volume with one or more regions not to be rendered is volume rendered.

For volume rendering, the user may specify one or more arbitrarily shaped regions for masking. Uninterested structures may be masked from the volume data. In typical applications, the user draws 2D curves that are extruded or extrapolated along the viewing frustum to create the 3D geometric regions. The resulting regions are punching masks or regions.

The punching masks are used in volume rendering to avoid rendering these regions. The geometric punching information is converted to a punching volume defining, for each voxel, whether the voxel is masked out. This voxelization process transforms a contiguous geometric description into a discrete volume representation, resulting in information loss. Typically, the punching volume is treated as a discrete binary volume mask. Rendering of the binary mask generates staircase surfaces that do not exist in the original punching geometry. This voxelization process can also be time-consuming, and storing the punching volume requires extra memory.

Using a fuzzy volume instead of a binary mask may reduce the staircase artifacts. However, the fuzzy volume requires even more memory and only renders visually smooth surfaces. There is no guarantee that the fuzzy volume approach accurately reproduces the original boundaries between punched and non-punched regions.

BRIEF SUMMARY

By way of introduction, the preferred embodiments described below include methods, systems, instructions, and computer readable media for rendering with a punching mask. A plurality of sub-volumes is identified as a function of the punching mask. The sub-volumes are generally layered in range and do not include spatial locations of the punching mask. Each sub-volume is rendered separately or independently. The renderings from multiple passes or sub-volumes are composited together.

In a first aspect, a computer readable storage medium has stored therein data representing instructions executable by a programmed processor for rendering a volume with a punching mask. The storage medium includes instructions for a plurality of acts. A viewer location is identified. A first far layer of locations is determined relative to the viewer location as a function of the punching mask such that the punching mask is behind the first far layer. A first near layer of locations is determined relative to the viewer location. A first sub-volume bounded by the first far layer and the first near layer is rendered. A second far layer of locations is determined relative to the viewer location. A second near layer of locations is determined relative to the viewer location. The determination is a function of the punching mask such that the punching mask is in front of the second near layer. A second sub-volume bounded by the second far layer and the second near layer is rendered. The second sub-volume is free of locations for the first sub-volume.

In a second aspect, a method is provided for rendering a volume with a punching mask. The punching mask is identified. Data for a plurality of depth layers is determined where each depth layer includes data spaced along a viewing direction. The determination is a function of the punching mask. The plurality of depth layers are volume rendered separately.

In a third aspect, a system is provided for rendering a volume with a punching mask. A memory is operable to store a dataset representing a three-dimensional volume and operable to store the punching mask relative to the three-dimensional volume. The punching mask defines a first sub-volume. A processor is operable to volume render the three-dimensional volume by multiple rendering passes for different sub-volumes other than the first sub-volume. The different sub-volumes are determined as a function of the punching mask.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Punching masks are volume rendered as geometric meshes. Converting the mask to an additional volume may be avoided. The geometric punching information is directly used for rendering. To handle arbitrary complex punching geometries, the voxels that fall into non-punched range layers are rendered in multiple passes. This range-peeling algorithm finds range layers for removing uninterested punch regions. The layers may not be thin surface layers for surface rendering, but may be multiple voxel deep sub-volumes.

For rendering of a geometrically punched volume, the volume is divided into two types of regions, punched and non-punched. The volume renderer only renders the voxels lying in the non-punched region. A set of depth ranges are found directly from the punch geometry. The depth ranges contain only the non-punched regions. The rendering is restricted to these depth ranges. The rendering then becomes a multi-pass process. The number of passes is equal to the number of range layers. The set of depth ranges are processed in sequence, such as back-to-front or front-to-back compositing. By operating front-to-back, the renderer can utilize early-ray-termination for acceleration.

This range-peeling approach can be flexibly used in conjunction with a wide variety of volume rendering frameworks. For example, the range-peeling can be implemented on a graphics processing unit (GPU) to output the range layers, which can subsequently be used in a volume renderer on a software or a different hardware platform in a multi-pass fashion. Alternatively, the entire range-peeling can be integrated into a single volume rendering implementation. This range-peeling method is compatible with bricking and brick-based invisible space skipping, minimizing the overhead of multi-pass rendering.

Figure 1:
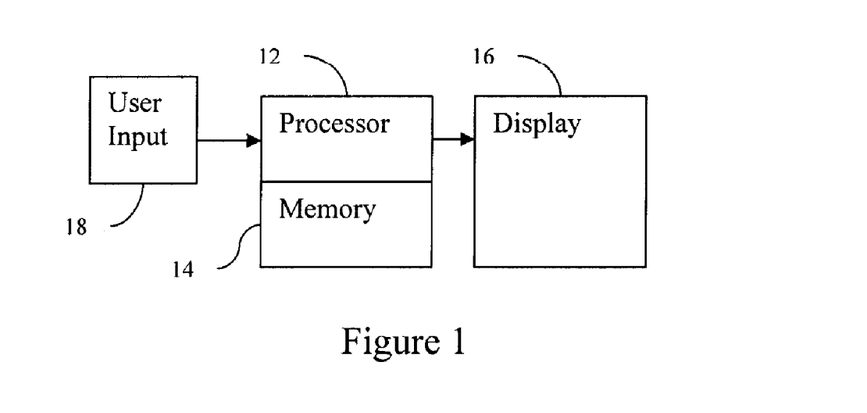
FIG. 1 is a block diagram of one embodiment of a system for rendering a volume with a punching mask.

FIG. 1 shows a system for rendering a volume with a punching mask. The system includes a processor 12, a memory 14, a display 16, and a user input 18. Additional, different, or fewer components may be provided. For example, a network or network connection is provided, such as for networking with a medical imaging network or data archival system.

The system is part of a medical imaging system, such as a diagnostic or therapy ultrasound, x-ray, computed tomography, magnetic resonance, positron emission, or other system. Alternatively, the system is part of an archival and/or image processing system, such as associated with a medical records database workstation. In other embodiments, the system is a personal computer, such as desktop or laptop, a workstation, a server, a network, or combinations thereof for rendering three-dimensional representations.

The user input 18 is a keyboard, trackball, mouse, joystick, touch screen, knobs, buttons, sliders, touch pad, combinations thereof, or other now known or later developed user input device. The user input 18 generates signals in response to user action, such as user pressing of a button.

The user input 18 operates in conjunction with a user interface for context based user input. Based on a display, the user selects with the user input 18 a three-dimensional region for punching. For example, the user traces a two-dimensional region. Other user controls may be provided for defining a punching region using one, two or three-dimensional input information. In alternative embodiments, the processor 12 determines the punching region automatically (e.g., using boundary detection) or semi-automatically.

The memory 14 is a graphics processing memory, a video random access memory, a random access memory, system memory, random access memory, cache memory, hard drive, optical media, magnetic media, flash drive, buffer, combinations thereof, or other now known or later developed memory device for storing data or video information. The memory 14 stores one or more datasets representing a three-dimensional volume for rendering.

Any type of data may be used for volume rendering, such as medical image data (e.g., ultrasound, x-ray, computed tomography, magnetic resonance, or positron emission). The rendering is from data distributed in an evenly spaced three-dimensional grid, but may be from data in other formats (e.g., rendering from scan data free of conversion to a Cartesian coordinate format or scan data including data both in a Cartesian coordinate format and acquisition format). The data is associated with different volume locations in a volume, so is voxel data. The voxels are the same size and shape within the dataset. Voxels with different sizes, shapes, or numbers along a dimension may be included in a same dataset.

The dataset is provided in real-time with acquisition. For example, the dataset is generated by medical imaging of a patient. The memory 14 stores the data temporarily for processing. Alternatively, the dataset is generated from memory, such as associated with rendering a virtual object or scene or from loading a previous scan of a patient.

The memory 14 is operable to store the punching mask. The spatial locations relative to the volume to be rendered are stored. For example, the spatial locations identified by the user are stored. The punching mask is a sub-volume of contiguous or discontiguous voxels. The boundary of the punching mask is stored without associating each voxel as punched or not punched. Alternatively, an identification of each voxel within the punching region is stored.

The processor 12 is a central processing unit, control processor, application specific integrated circuit, general processor, field programmable gate array, analog circuit, digital circuit, graphics processing unit, graphics chip, graphics accelerator, accelerator card, combinations thereof, or other now known or later developed device for rendering with a punching mask. The processor 12 is a single device or multiple devices operating in serial, parallel, or separately. The processor 12 may be a main processor of a computer, such as a laptop or desktop computer, may be a processor for handling some tasks in a larger system, such as in an imaging system, or may be a processor designed specifically for rendering. In one embodiment, the processor 12 is a personal computer graphics accelerator card or components, such as manufactured by nVidia (e.g. Quadro4 900XGL or others), ATI (e.g. Radeon 9700 or others), or Matrox (e.g. Parhelia or others).

The range-peeling algorithm may be executed efficiently by a graphics processing unit. The processor 12 may be hardware devices for accelerating volume rendering processes, such as using application programming interfaces for three-dimensional texture mapping. Example APIs include OpenGL and DirectX, but other APIs may be used independent of or with the processor 12. The processor 12 is operable for volume rendering based on the API or an application controlling the API. The processor 12 is operable to texture map with alpha blending, minimum projection, maximum projection, surface rendering, or other volume rendering of the data. Other types of volume rendering, such as ray-casting, may be used. Other types of rendering may be used. For example, in the scenario of applying masks to surface models, range peeling and rendering geometry only within the depth ranges may be used.

The processor 12 is operable to identify the punching mask. For example, the processor 12 receives the user indication as an output of the user input 18. The processor 12 identifies the corresponding spatial locations or boundary. For example, the user traces a two-dimensional region and indicates which portion of the region relative to the trace is to be punched. The processor 12 extrapolates the two-dimensional region into a three-dimensional volume, such as extruding or extending the region along the viewing direction. Other extrapolations may be used. If the user defines more than one punching region, the processor 12 combines the punching regions.

The processor 12 is operable to volume render the three-dimensional volume. The processor 12 identifies different sub-volumes to be rendered in multiple rendering passes. The sub-volumes are separate layers that do not include voxels for the punched region. The sub-volumes are determined as a function of the punching mask. For example, a far surface and then a near surface are identified for each of the sub-volumes and corresponding rendering pass. The sub-volume includes spatial locations between the two surfaces. The far and near surfaces are determined based on the punching mask and any previously rendered layers. The different layers are separately rendered in the multiple passes in a front-to-back or back-to-front order. The back and front are relative to the virtual view location (the origin of the viewing direction).

The memory 14 and/or another memory stores instructions for operating the processor 12. The instructions are for rendering multiple layers with a punching mask. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multi-processing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

Figure 2:
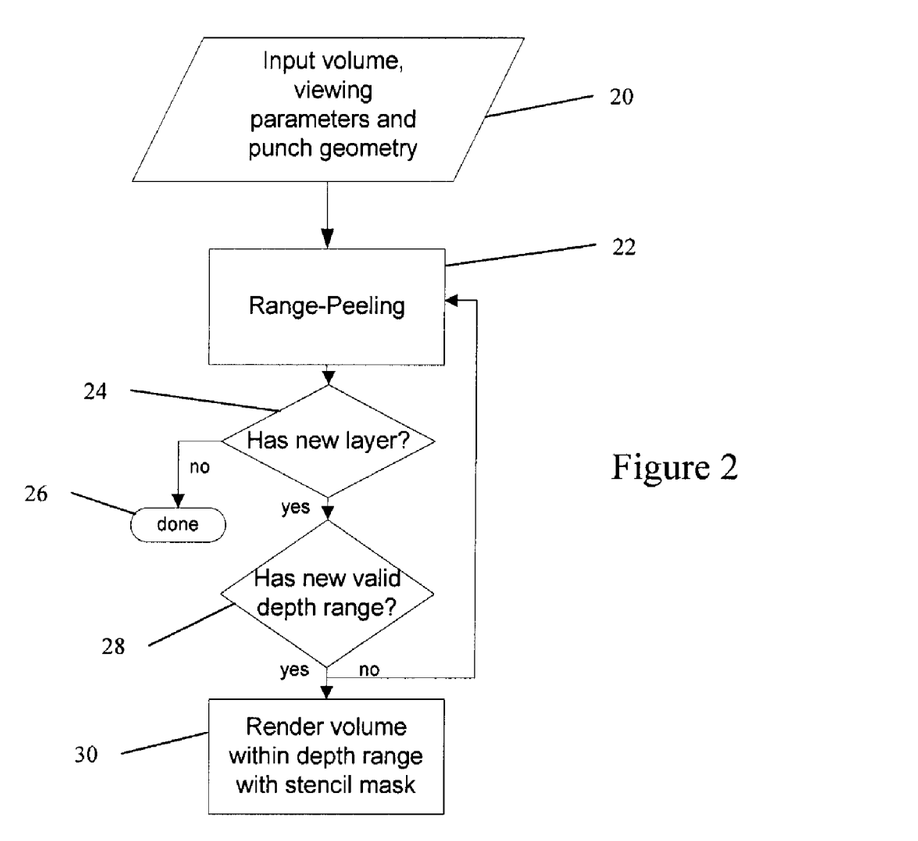
FIG. 2 is a flow chart diagram of one embodiment of a method for rendering a volume with a punching mask.

FIG. 2 shows a method for rendering a volume with a punching mask. The method is implemented by the system of FIG. 1 or another system. The method is performed in the order shown or other orders. Additional, different, or fewer acts may be provided.

In act 20, the dataset for rendering is received with viewing parameters and a punch geometry. The dataset is received from a memory, from a scanner, or from a transfer. The dataset is isotropic or anisotropic. The dataset has voxels spaced along three major axes. The voxels have any shape and size, such as being smaller along one dimension as compared to another dimension.

The viewing parameters determine a view location. The view location is a direction relative to the volume from which a virtual viewer views the volume. The view location defines a view direction. The viewing parameters may also include scale, zoom, shading, lighting, and/or other rendering parameters. User input or an algorithm defines the desired viewer location. In one embodiment, the view direction is used to initialize a near depth buffer and a far depth buffer. Both buffers are initialized to 0 (nearest).

Figure 3A:
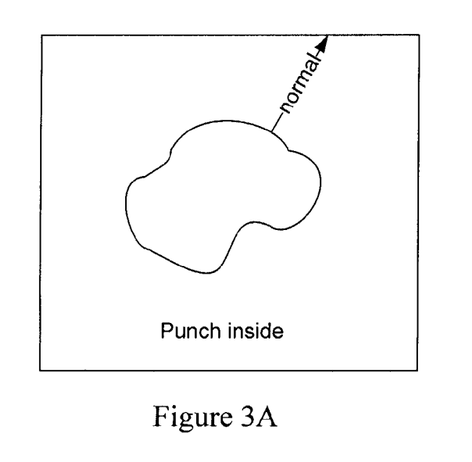
FIGS. 3A and 3B are exemplary graphical representations of a punching region.
Figure 3B:
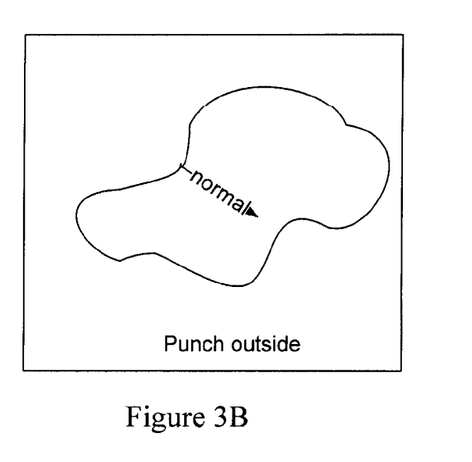

The punch geometry identifies spatial locations or voxels not to be used for rendering. The identification may be of voxels included or excluded from the rendering. In one embodiment, the punch geometry is a polygon of an arbitrary shape and size, such as shown in FIGS. 3A and 3B. A normal or other designation indicates which portion is to be punched. Without losing generality, surface normals are assumed to always point towards the non-punched region, as shown in FIGS. 3A and 3B, indicate the portion to be punched. The range peeling algorithm may be easily modified if the surface normals of the punching geometry point toward the puched region. A region of the surface with normals pointed towards the rendering view is considered as front-facing. Contrarily, a surface region with normals pointed away from the rendering view is considered as back-facing. The examples of FIGS. 3A and 3B are front-facing.

Figure 4A:
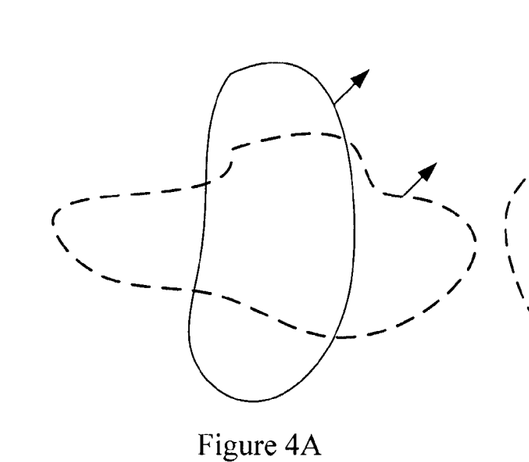
FIGS. 4A and 4B are exemplary graphical representations of combinations of punching regions.
Figure 4B:
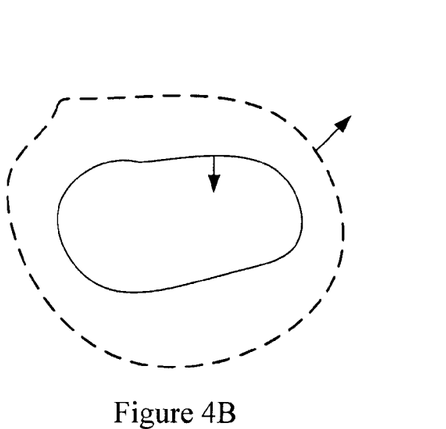

The punch geometry may be combined from a plurality of regions or define multiple regions. Since the user may specify multiple punching geometries and these geometries may be nested or intersect each other, the spatial locations of the geometries are combined to form a unified punching mask. FIGS. 4A and 4B shows two examples. Each example has two punching geometries displayed as 2D curves or polygons. The punched region or punching mask for rendering is formed as the union of all regions defined by each individual punching geometry. In FIG. 4A, the punched region includes both the dashed and the solid bound areas. The normals indicate punching of regions inside each of the intersecting polygons. In FIG. 4B, the larger curve or polygon (dashed) indicates punching the inside region. The smaller curve or polygon (solid line) indicates punching the outside region. This may be used to define a hollow cylinder between the two polygons. Alternatively, this defines the dashed area as the whole punched region (i.e., a solid cylinder). Any representation for combining may be used.

In act 22, data for a depth layer or sub-volume is determined. Based on the loop back from act 30, a plurality of depth layers are determined. Each depth layer includes data or voxels spaced along a viewing direction.

The sub-volume for the depth layer is determined. By repeating sub-volume identification, different sub-volumes are identified as depth layers. Each depth layer or sub-volume includes only non-punched spatial locations and spatial locations not included in other sub-volumes. The multi-pass rendering process uses depth ranges of voxels in each sub-volume. For example, range-peeling is applied to find the first set of depth ranges containing the non-punched region nearest to the rendering view. Range-peeling is then applied to find the next depth range further from the rendering view than the last range. The sub-volumes are identified as a function of depth location relative to other layers along the view direction.

The determination of the range of each layer is a function of the punching mask geometry. The view direction establishes the relative position of the punching mask to the non-punched data. The non-punched data is then layered for rendering in multiple passes.

To determine voxels included in each layer, near and far surfaces of the layer are identified. The range peeling algorithm is a multipass approach that renders the punching geometry multiple times. Each pass outputs two depth buffers, specifying the near and far surfaces of the layer. The far surface is a nearest front facing surface deeper than any previous far layer relative to the viewer location. For an example using the depth buffers of a GPU, the depth of the nearest front-facing surface that is farther than the current far depth buffer is identified according to the following. The depth of the frame buffer is initialized to 1, which is the farthest of the scene. The scene is set larger than the volume to avoid clipping, but may be smaller. A standard depth test is enabled, where a fragment is discarded if its depth is greater than the current depth value in the frame buffer. Back facing polygons are culled. In addition, the depth value of each fragment is also compared with the depth of the corresponding pixel in the far depth buffer. A new far surface deeper than a the previous far depth (stored in the far depth buffer) is identified. Any fragment equal or closer than the previous far depth is discarded. The previous far depth is stored in the far depth buffer. Then, the depth in the frame buffer is copied to the far depth buffer. Other approaches for identifying the far surface may be used.

The near surface is a farthest back-facing surface closer than the corresponding far layer. The front edge or surface of the dataset or volume to be rendered is a first back-facing surface. In a GPU example, the near depth is identified according to the following after the far depth buffer is updated. In this stage, the depth of the frame buffer is initialized to 0, and front face culling is enabled. In addition, the depth test is reversed. Only fragments with greater depth values than the values in frame buffer can pass. A second depth test against the far depth buffer is also applied. Furthermore, the stencil buffer records which pixels correspond to valid depth ranges in this step. If the near and far buffers are at a same location, there is no data at those pixel locations for rendering. The stencil buffer is initialized to 0, and a pixel in the stencil buffer is set to 1 if a corresponding fragment passes the test. The depth contents of the frame buffer after the depth tests are treated as the near surface. Other approaches for identifying the near surface may be used.

In act 24, whether a new layer was identified in the range-peeling of act 22 is determined. If no new layer is to be rendered, the flow proceeds to act 26. In act 26, the rendering is complete.

If a new layer is to be rendered, the flow proceeds to act 28. In act 28, valid depth ranges are determined. For some locations, no spatial locations and corresponding data exist between the far and near surfaces. To avoid rendering inefficiently, the rendering may be performed for only valid depth ranges. For example, the stencil buffer identifies pixel locations associated with data for rendering. The sub-volume between the near and far surfaces is rendered with the stencil mask enabled. Only pixels with stencil value greater than 0 are updated. Early stencil test may be enabled if it is available in hardware. If no data is provided in the layer for rendering at a given pixel, the process returns to act 22. For pixels with valid depth ranges, the data along the viewing direction is rendered in act 30.

In act 30, the plurality of depth layers are rendered separately. By selecting sub-volumes not excluded by the punching mask, rendering may be performed without a binary mask. The stair-step artifact may be avoided by directly rendering from the data set. The layering allows rendering in multiple passes while accounting for any shape of the punching mask. The geometry of the punch mask is encoded into continuous depth range values. In this way, the range-peeling method preserves rendering quality by avoiding the voxelization process as well as the associated inaccuracy. Memory may be saved since storage and processing of the intermediate punching volume is eliminated. The rendering is based on the original continuous geometric information, preserving any details of the punching boundaries. If the punching boundary is smooth, smooth surfaces are rendered in the images.

The different sub-volumes are rendered to the same buffer. By compositing the sub-volumes in the same buffer or image, the final rendering or image includes information from each sub-volume. The sub-volume renderings are composited together.

For rendering a sub-volume, data along the range or depth dimension for each pixel location is combined. The data within the depth range of the sub-volume is selected and used for rendering. The near and far surfaces or depth buffers define the voxels within the depth layer to be used for rendering. For any given pixel, one or more voxels may be provided along the range dimension. For example, the depth layer may be many voxels deep at a particular location. Different ranges of depth may be provided for the different pixel locations of the sub-volume. The rendering is performed for each pixel location.

Volume rendering is performed with the dataset based on spatial locations within the sub-volume. The rendering application is an API, other application operating with an API, or other application for rendering. In one embodiment, the rendering is performed with a depth buffer of a GPU.

Any now known or later developed volume rendering may be used. For example, projection or surface rendering is used. In projection rendering, alpha blending, average, minimum, maximum, or other functions may provide data for the rendered image along each of a plurality of ray lines or projections through the volume. Different parameters may be used for rendering. For example, the view direction determines the perspective relative to the volume for rendering. Diverging or parallel ray lines may be used for projection. The transfer function for converting luminance or other data into display values may vary depending on the type or desired qualities of the rendering. Other masking and/or clipping may determine data to be used for rendering. Segmentation may determine another portion of the volume to be or not to be rendered. Opacity settings may determine the relative contribution of data. Other rendering parameters, such as shading or light sourcing, may alter relative contribution of one datum to other data. The rendering uses the data representing a three-dimensional volume to generate a two-dimensional representation of the volume.

In the GPU embodiment, the identification of the near and far surfaces and the rendering use two depth tests for each fragment. If available, the two depth tests are implemented by using direct hardware support. Alternatively, one of the depth buffers is copied to a depth texture and the associated depth test is applied in the fragment program. Other implementations of the depth tests may be used.

The range-peeling and rendering for sub-volumes is repeated until no new layers remain in act 24. For each repetition, another sub-volume is identified and rendered.

Figure 5A:
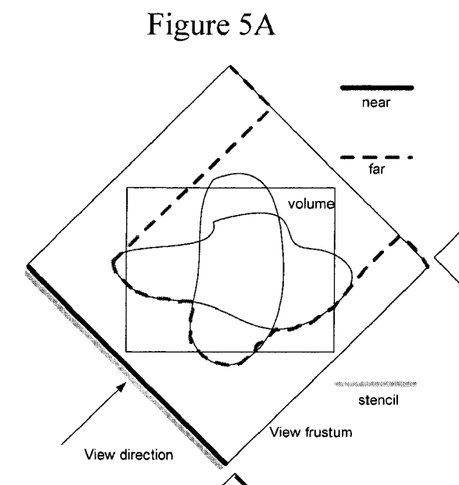
FIGS. 5A-C are graphical representations of one example for rendering with a punching mask using range peeling.
Figure 5B:
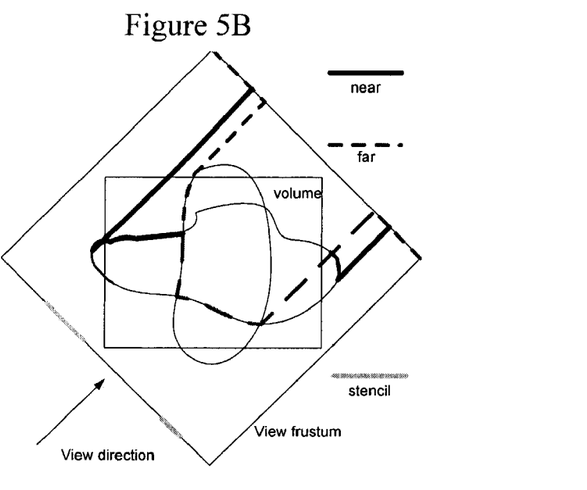
Figure 5C:
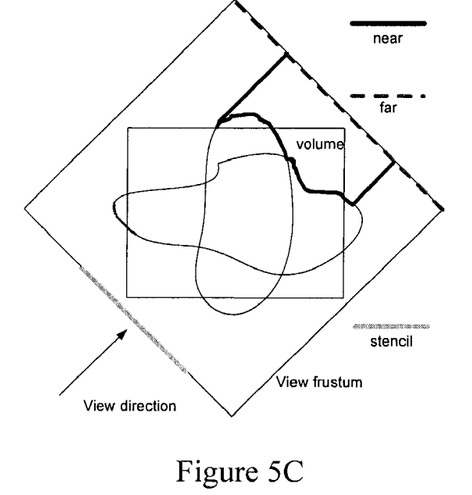

FIGS. 5A-C show an example implementation. In this example, three layers are created based on the shape of the punching mask. The punching mask geometry from FIG. 4A is used. The punching mask is the unity of two geometries in the center of the volume. Other punching masks or number of layers may be used. The sub-volume of the first layer is nearest to the viewer location, the sub-volume of the intermediate layer is in front of the sub-volume for the farthest layer, but only in part. Different algorithms may identify the extent of the layers in different ways.

In FIGS. 5A-C, the near and far depth buffers are illustrated with solid and dashed curves or lines, respectively. The viewing direction is shown as a vector relative to the volume. The volume to be rendered is shown two-dimensionally for simplicity as a smaller box. The larger box specifies the view-frustum or space being rendered with a near face, far face and two sides along the viewing frustum. The punching geometry is shown extending outside the volume in this example, but may be entirely within the volume.

FIG. 5A shows the sub-volume for a closest depth layer to the viewer location. The far layer of locations (i.e., far surface) is determined relative to the viewer location as a function of the punching mask. The punching mask is positioned behind the first far layer. Locations farthest from the viewer location and visible from the viewer location without viewing through the punching mask are included within the sub-volume. Accordingly, the far surface includes the closest surface visible from the viewer location. On the sides, the closest far surface is the back of the volume to be rendered.

The near layer of locations is also determined relative to the viewer location. For the first depth layer, the near surface is determined as a front surface of the volume relative to the viewer location. The spatial locations between the near and far surfaces define the sub-volume or near depth layer.

The sub-volume bounded by the far layer and the near layer is rendered. The stencil extends across the volume from side to side since voxels are included in the sub-volume for each pixel. Along each ray line for projection rendering or for each pixel, a rendered value is determined based on the voxels as a function of depth.

FIG. 5B shows an intermediate or middle layer. The close sub-volume is removed or not considered. Similarly, the forward facing portion of the punching mask bounding the close sub-volume is removed or not considered. A new far layer of locations is determined relative to the viewer location as a function of the punching mask. The next closest surface of the remaining forward facing surfaces of the punching mask are identified. The spatial locations visible to the user after peeling or removing the near layer are included in the middle layer. Since the punching mask is formed from two sets of polygons, the far surface includes punching mask regions shown in this two-dimensional representation as a dashed line relative to portions of the punching mask.

The near layer of locations is determined relative to the viewer location as a function of the punching mask. Spatial locations between the far layer and the previous far layer not within the punching mask are identified. The near and far surfaces define the intermediate sub-volume. The layer may be continuous or discontinuous. As represented in two-dimensions, the layer is discontinuous. In three-dimensions, the layer may be continuous, such as cylindrical.

The sub-volume bounded by the current or intermediate far and near layers is rendered. Each sub-volume is free of locations for the other sub-volumes. The near depth and far depths may coincide in some areas. As represented by the stencil boundaries, voxels in these coinciding areas are not rendered. The rendering is performed for the stencil identified pixels.

FIG. 5C shows a farthest layer. No unused forward facing boundaries other than the rear of the volume remain. The far layer of locations is determined relative to the viewer location. The closest front facing surface not considered in the other sub-volumes is the back surface of the entire volume. The far layer is set as the back or rear surface relative to the viewer location.

The near layer of locations is determined relative to the viewer location. The near layer extends along the remaining portions of the punching mask. These portions are back facing or a back surface. The punching mask is in front of the near layer. The sub-volume is free of locations for the other sub-volumes.

The sub-volume of the farthest depth layer is rendered. The voxels bounded by far and near layers are composited with other renderings. The stencil buffer indicates the pixels to be rendered for this layer.

After rendering each of the sub-volumes, a two-dimensional representation of the volume without the data within the punching mask geometry is generated. The punching mask represents a void rather than an obstruction.

The rendering with range-peeling may be performed on large volumes. For large volumes, bricking may be used due to memory availability. Since multi-pass rendering can induce some performance overhead, range-peeling may be used together with a bricked cache and with invisible space skipping techniques, such as disclosed in U.S. Published Patent Application No. 2006/0164410 (U.S. Ser. No. 11/235, 408, filed Sep. 26, 2005), the disclosure of which is incorporated herein by reference.

Figure 6:
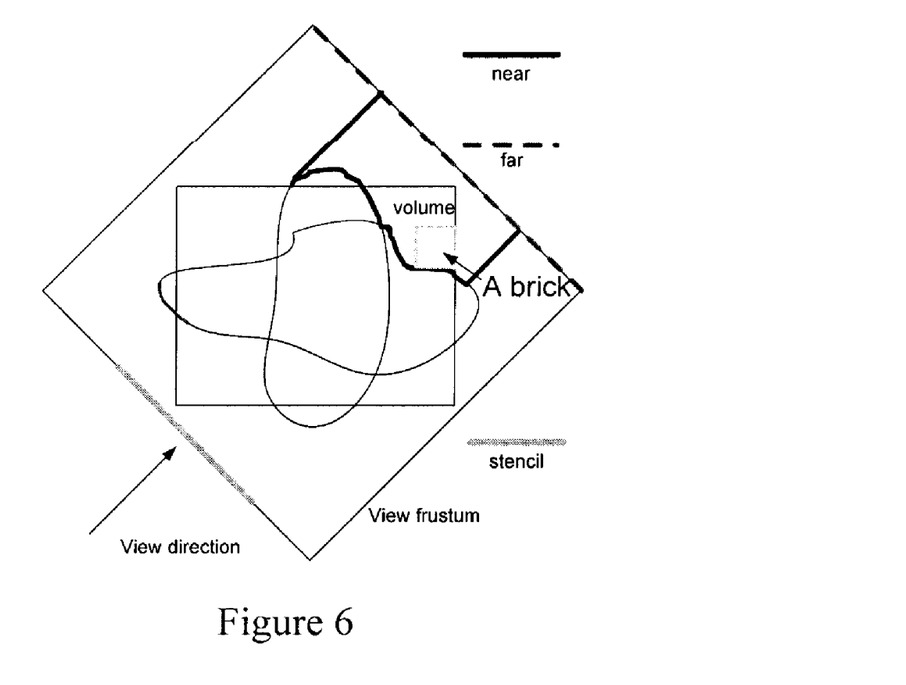
FIG. 6 is a graphical representation of one embodiment for rendering, using bricking, by range-peeling for a punching mask.

For bricking, the entire volume is divided into bricks that are aligned with the major axes of the volume. Each brick represents a three-dimensional region. FIG. 6 shows one such brick. Only bricks containing visible voxels are rendered. Bricks not within a current layer are ignored, removed from cache, or not cached. Bricks including data within a current layer are cached for rendering. The brick cache system keeps frequently used bricks in graphics hardware memory to reduce the cost of transferring them.

To determine whether a brick is to be used for a given layer, the brick boundaries are tested prior to volume rendering of the sub-volume defined by the brick. When range-peeling is applied, a brick is first tested whether any of its voxels falls between the current near and far surfaces. Bricks outside of the depth ranges are simply skipped for rendering in the current rendering pass. A brick may be needed for multiple rendering passes if some of the punching geometry intersects the brick. In that case, the brick cache system avoids the brick being swapped outside the graphics memory, more likely ensuring that each brick is downloaded from system memory to graphic memory at most once for all the rendering passes of the current frame of image.

Figure 7:
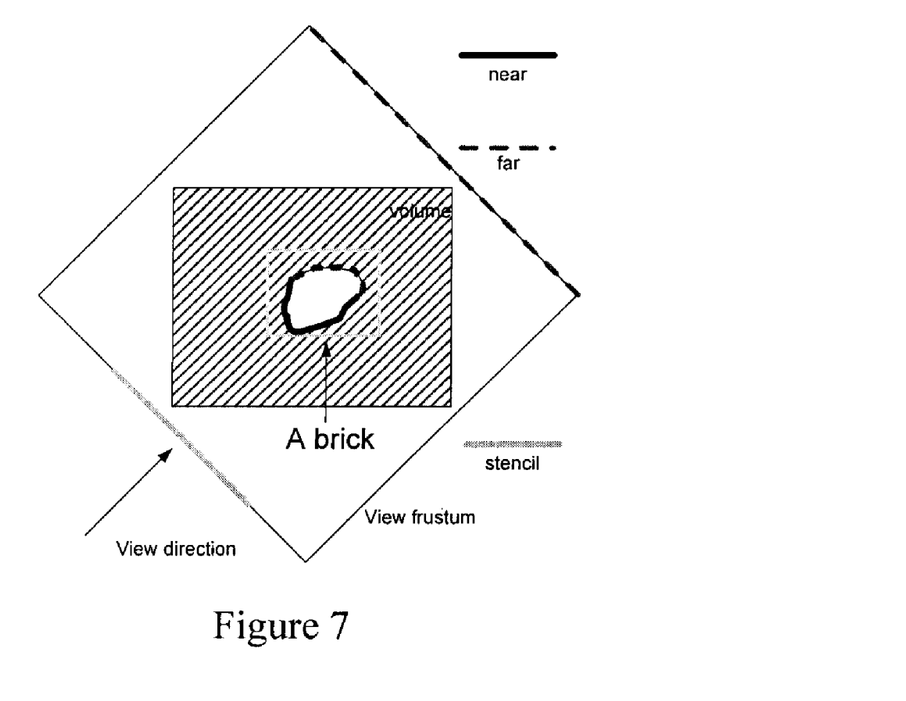
FIG. 7 is a graphical representation of another embodiment for rendering, using bricking, by range-peeling for a punching mask.

To reduce the cost of determining whether a brick is needed for the current depth layer, the bounding box faces of the brick are rendered. For the rendering, each fragment of the bounding box faces is tested against the two depth buffers and the stencil buffer. A brick may still intersect with a depth range layer even where all the face fragments are outside the range. As shown in FIG. 7, the bounding box of the brick has no fragment between the two depth buffers. However, voxels of the brick are visible for this depth layer. Only bricks that are completely closer than the near depth or completely farther than the far the depth are discarded. The bricks may be identified for discarding or no caching in a two-pass rendering utilizing occlusion culling. In the first pass, whether there is any boundary fragment that is farther than the near depth is checked. If no boundary fragment passes, the whole brick is closer than the near depth, and the second pass is skipped. Otherwise, in the second pass, the bounding box is rendered again. In this pass, whether there is any boundary fragment that is closer than the far depth is tested. If so, a voxel of the brick may be visible. Otherwise, the whole brick is farther than the far depth. The utilization of invisible space skipping with depth range may reduce the overhead of multi-pass rendering. All fragments are also tested against the stencil buffer, so that only fragments in non-zero depth range pass.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. In a computer readable storage medium having stored therein data representing instructions executable by a programmed processor for rendering a volume of voxels with a punching mask, the storage medium comprising instructions for:

identifying a viewer location;

determining a first far layer of locations relative to the viewer location as a function of the punching mask such that the punching mask is behind the first far layer;

determining a first near layer of locations relative to the viewer location;

rendering a first sub-volume bounded by the first far layer and the first near layer;

determining a second far layer of locations relative to the viewer location;

determining a second near layer of locations relative to the viewer location, the determining of the second near layer being as a function of the punching mask such that the punching mask is in front of the second near layer, the punching mask indicating a region within the volume, the region defining voxels not to be used in any rendering, the region blocking the viewer location from at least some of the voxels of the second layer and not blocking the voxels of the first sub-volume from the viewer location; and rendering a second sub-volume bounded by the second far layer and the second near layer, the second sub-volume free of locations for the first sub-volume.

2. The instructions of claim 1 wherein determining the first far layer comprises determining locations farthest from the viewer location and visible from the viewer location without viewing through the punching mask; and wherein determining the first near layer comprises determining a front surface of the volume relative to the viewer location.

3. The instructions of claim 1 wherein determining the second far layer of locations comprises determining a rear surface of the volume relative to the viewer location; and wherein determining the second near layer of locations comprises determining a back surface of the punching mask relative to the viewer location.

4. The instructions of claim 1 wherein determining the first and second far layers comprise identifying a nearest front facing surface deeper than any previous far layer relative to the viewer location.

5. The instructions of claim 1 wherein determining the first and second near layers comprise identifying a farthest back-facing surface closer than the corresponding far layer.

6. The instructions of claim 1 wherein first and second sub-volumes include multiple voxels spaced along a view direction for at least one pixel.

7. The instructions of claim 1 wherein rendering the first and second sub-volumes comprises rendering with a stencil mask enabled.

8. The instructions of claim 1 wherein determining the first and second near and far layers comprises encoding a geometry of the punch mask into continuous depth range values.

9. The instructions of claim 1 further comprising:
determining a third far layer of locations relative to the viewer location as a function of the punching mask;
determining a third near layer of locations relative to the viewer location as a function of the punching mask; and
rendering a third sub-volume bounded by the third far layer and the third near layer, the third sub-volume free of locations for the first and second sub-volumes, the first sub-volume being a nearest volume rendering layer, the second sub-volume being a farthest volume rendering layer, and the third sub-volume being intermediate to the first and second sub-volumes.

10. The instructions of claim 1 further comprising:
testing brick boundaries prior to rendering the first and second sub-volumes.

11. A method for rendering a volume with a punching mask, the method comprising:
identifying the punching mask from user input defining a polygon, the punching mask being defined independent of values of the voxels representing the volume;
determining data for a plurality of depth layers, each depth layer comprising data spaced along a viewing direction, the determining being a function of the punching mask; and volume rendering, by a graphics processing unit, the plurality of depth layers separately.

12. The method of claim 11 wherein determining comprises:
identifying a first sub-volume as a first one of the depth layers, the first depth layer including only non-punched regions and being identified as a function of the punching mask and a view direction; and
identifying a second sub-volume as a second one of the depth layers, the second depth layer including only non-punched and non-first sub-volume regions, the identifying being a function of depth location relative to the first depth layer along the view direction; and
wherein volume rendering comprises:
rendering the first sub-volume;
rendering the second sub-volume; and
compositing the renderings of the first and second sub-volumes together.

13. The method of claim 11 wherein determining comprises, for each depth layer of the plurality of depth layers:
identifying a far surface as a nearest front facing surface deeper than any previous far layer relative to the viewer location; and
identifying a near surface as a farthest back-facing surface closer than the corresponding far layer;
wherein the near and far surfaces define voxels within the depth layer and are spaced apart by two or more voxels along the viewing direction for at least one pixel.

14. The method of claim 11 wherein volume rendering comprises rendering with a stencil mask enabled.

15. The method of claim 11 wherein determining comprises encoding a geometry of the punch mask into continuous depth range values, and wherein volume rendering comprises volume rendering without a binary mask.

16. The method of claim 11 further comprising:
testing brick boundaries prior to volume rendering each of the depth layers.

17. A system for rendering a volume with a punching mask, the system comprising:
a memory operable to store a dataset representing a three-dimensional volume and operable to store the punching mask relative to the three-dimensional volume, the punching mask defining a first sub-volume and being a geometric mesh defining a masked region of the volume; and
a processor operable to volume render the three-dimensional volume by multiple rendering passes for different sub-volumes other than the first sub-volume, the different sub-volumes determined as a function of the punching mask.

18. The system of claim 17 further comprising:
a user input;
wherein the processor is operable to identify the punching mask from an output of the user input.

19. The system of claim 17 wherein the processor is operable to volume render in different passes sub-volumes corresponding to different layers, the multiple passes proceeding in a front-to-back or back-to-front order relative to a view location, each of the different layers being separate from the other ones of the different layers and the first sub-volume.

20. The system of claim 17 wherein the processor is operable to identify a far surface and then a near surface for each of the sub-volumes and corresponding rendering pass, one or both of the near and far surface identified as a function of the punching mask.

* * * * *